A. A. SKINNER.
Butter-Salting Scales.

No. 157,233. Patented Nov. 24, 1874.

Witnesses:
Judson A Root
Ruth E Root

Inventor:
Alba A Skinner

UNITED STATES PATENT OFFICE.

ALBA A. SKINNER, OF OXFORD, NEW YORK.

IMPROVEMENT IN BUTTER-SALTING SCALES.

Specification forming part of Letters Patent No. 157,233, dated November 24, 1874; application filed April 28, 1874.

*To all whom it may concern:*

Be it known that I, ALBA A. SKINNER, of Oxford, Chenango county, State of New York, have invented a Butter-Salting Scale, of which the following is a specification:

The object of my invention is to easily determine the exact quantity of salt to be used, so that butter may be salted to any degree of saltness, and different and unequal churnings salted uniformly.

Figure 1:
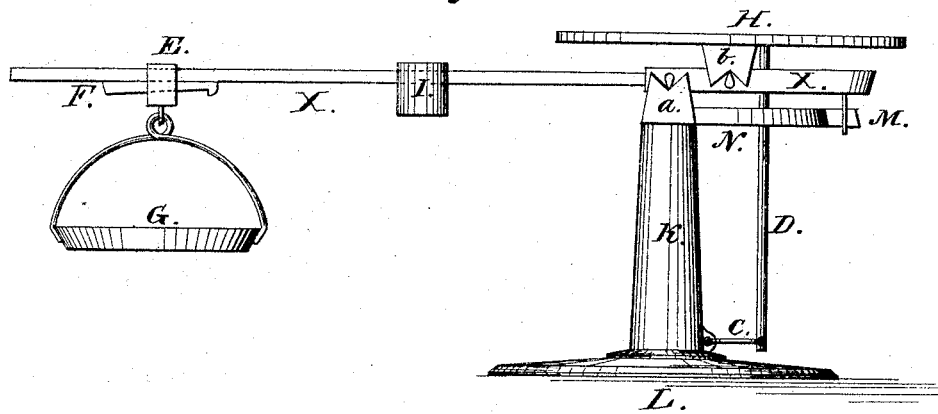
Figure 2:
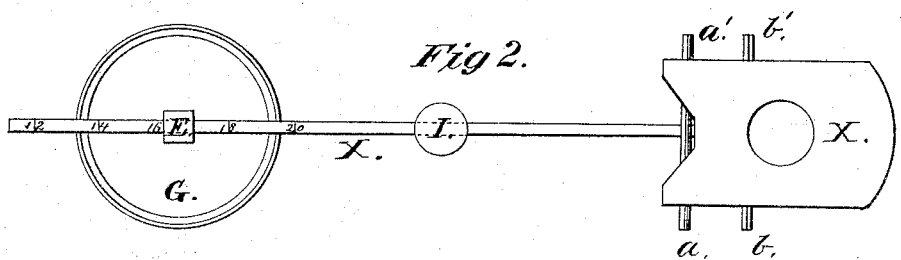
Figure 3:
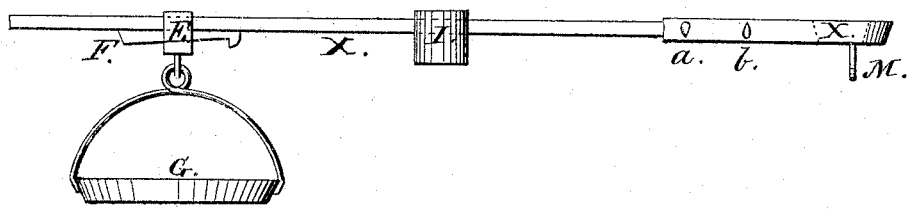

The machine, Figure 1, consists of a balance-bar, X, resting upon the fulcrum-pivots $a$ $a'$, and supporting a platform, H, by two other pivots, $b$ $b'$. The platform is kept in a horizontal position by means of a joint, C, and stem D; and the bar is held in position by a loop, M, passing around a standard-arm, N. Beneath the bar, and attached to it by a slide, E, and wedge F, is suspended a pan, G. A sliding weight is run upon the bar, and the whole is supported by a standard, K, and base L. The bar is graduated, as shown in Fig. 2, to sixteenths of ounces, indicating the amount of salt for each pound of butter.

To use the scale, the slide E is first made fast to the bar X at the point indicating the proportion of salt desired. The empty butter-bowl is then placed upon the platform H and balanced by means of the weight I. The butter is then placed in the bowl and enough salt put in the pan G to balance it, which will be the amount required. It is evident that the varying proportion may be obtained by making either of the three points $a$, $b$, or E movable.

I claim as my invention—

The combination, with the standard K, platform H, bar X, and weight I, of the pan G, constructed so as to slide upon said bar and be secured at any desired point by the wedge F, as and for the purpose set forth.

ALBA A. SKINNER.

Witnesses:
 JUDSON A. ROOT,
 RUTH E. ROOT.